United States Patent [19]

Ames

[11] 4,358,564
[45] Nov. 9, 1982

[54] PROCESS FOR CONTROLLING THE VISCOSITY DURING THE PREPARATION OF GRAFTED POLYETHYLENE AND ETHYLENE/ALPHA OLEFIN WAXES

[75] Inventor: William A. Ames, Longview, Tex.

[73] Assignee: Eastman Kodak Company, Rochester, N.Y.

[21] Appl. No.: 268,455

[22] Filed: May 29, 1981

[51] Int. Cl.$^3$ .................. C08L 23/26; C08L 51/06; C08F 255/02

[52] U.S. Cl. .................. 525/261; 525/264; 525/285; 525/301; 525/345; 525/386

[58] Field of Search .......... 260/28.5 A; 525/285, 525/301, 386, 345, 261, 264

[56] References Cited

U.S. PATENT DOCUMENTS 3,480,580 11/1969 Joyner et al. .................. 525/386
3,859,385 1/1975 Mainord .................. 525/386
3,859,386 1/1975 Mainord .................. 525/301
4,028,436 6/1977 Bogan et al. .................. 525/285

OTHER PUBLICATIONS

Polymer Handbook—Brandrup et al., Interscience Publishers, 1966, II 77–II 133.
Princ. of Poly. Chem.-Flory—1953—pp. 146–147 (Text Book).

Primary Examiner—Carman J. Seccuro
Attorney, Agent, or Firm—Clyde L. Tootle; Daniel B. Reece, III

[57] ABSTRACT

This invention relates to a process for controlling viscosity during the preparation of modified or grafted low viscosity polyethylene and ethylene/alpha olefin waxes comprising reacting the low viscosity waxes with an unsaturated polycarboxylic component in the presence of a free radical source and at least one viscosity stabilizer.

40 Claims, No Drawings

PROCESS FOR CONTROLLING THE VISCOSITY DURING THE PREPARATION OF GRAFTED POLYETHYLENE AND ETHYLENE/ALPHA OLEFIN WAXES

This invention relates to modified or grafted low viscosity polyethylene and ethylene/alpha-olefin copolymer waxes having improved physical properties, and the process for preparation thereof. The process of this invention includes both melt phase and solution processes for preparing modified or grafted low viscosity polyolefin waxes. The process comprises reacting the low viscosity polyethylene or ethylene/alpha-olefin copolymer waxes with an unsaturated polycarboxylic compound in the presence of a free radical source and at least one viscosity stabilizer.

It is known in the art to react poly-α-olefin compounds with polycarboxylic compounds to prepare modified or grafted polyolefin compositions. However, the teachings of the prior art, particularly when directed to reacting polyethylene waxes with polycarboxylic acids or anhydride carry out the reaction in the absence of a free radical initiator or catalyst, such as a peroxide. Heretofore, it was known in the art that to react polyethylene with unsaturated polycarboxylic acids in the presence of peroxides and oxygen provided only insoluble crosslinked unemulsifiable material. Therefore, it was believed necessary to carry out the reaction of low viscosity polyethylenes with unsaturated polycarboxylic acids in a solvent or in the complete absence of oxygen at elevated temperatures. While this type reaction provided modified polyethylenes which were emulsifiable and useful as waxes, the removal of the solvent added additional expense to the process.

A melt phase process using peroxide initiators is disclosed in U.S. Pat. No. 4,028,436 for grafting of unsaturated polycarboxylic acids and related compounds onto polyethylene waxes. According to the teachings of this patent, the waxes will not crosslink if oxygen is rigorously excluded from the reaction vessel. The $O_2$ content in the reaction vessel should be less than 5 ppm and preferably less than 2 ppm. While such conditions are relatively easy to maintain in the laboratory, they are difficult to maintain in production units. Even when an attempt is made to rigorously exclude oxygen, it has been found that relatively large viscosity increases occur.

It would therefore be an advance in the state of the art to provide processes for preparing low viscosity modified polyethylene or ethylene/alpha-olefin waxes by reacting the unmodified polyethylene or ethylene/alpha-olefin wax with a polycarboxylic acid using a free radical initiator under conditions where extreme measures to rigorously exclude oxygen or air are unnecessary. Such products would be useful in the emulsion forms as polishes and coating compositions and in the nonemulsifiable form as adhesives and paint priming compositions.

In accordance with this invention, it has been found that low viscosity polyethylene and ethylene alpha-olefin copolymer waxes can be modified to produce emulsifiable or nonemulsifiable waxes having improved physical and chemical properties. These modified waxes are prepared by reacting low viscosity waxes having less than 0.1 percent unsaturation with an unsaturated polycarboxylic component in the presence of a free radical source and at least one viscosity stabilizer. These modified low viscosity polyethylene waxes have a saponification number of from about 4 to about 250. The nonemulsifiable waxes have a saponification number of about 4 to about 60, preferably 10 to 40. The emulsifiable waxes have a saponification number of about 60 to 250, preferably about 100 to 220, most preferably about 100 to about 140, and are emulsifiable in both nonionic and anionic emulsification systems.

The unmodified low viscosity polyethylene and ethylene/alpha-olefins copolymers which contain at least one alpha-olefin monomer having from 3 to 12 carbon atoms include, for example, high, medium and low density polyethylene and copolymers of ethylene with propylene, butene-1, 4-methyl-1-pentene, 3-methyl-1-butene, 4,4-dimethyl-1-pentene, 3-methylpentene-1, 4-methylhexene-1, 5-ethylhexene-1, 6-methylheptane-1, hexene-1, heptene-1, octene-1, nonene-1, decene-1, dodecene-1 and the like. Such copolymers contain from 99 to 50 percent by weight ethylene, preferably 99 to 70 percent, such as, for example, a 95 ethylene/5 propylene copolymer, 98 ethylene/2-butene-1 copolymer and the like. Such homopolymers or copolymers can be either crystalline or amorphous, although the crystalline modified polyethylenes and ethylene/alpha olefin waxes are generally more useful in floor polish applications, whereas the amorphous modified ethylene/alpha-olefins are generally more useful in hot-melt adhesive applications.

The unmodified polyethylene or ethylene/alpha-olefin waxes can be prepared by direct synthesis or by degrading high molecular weight polyethylene or ethylene containing copolymers prepared by conventional polymerization processes. Such suitable low viscosity waxes prepared directly or by thermal degradation have a melt viscosity of 5 to 40,000 cp. at 150° C., preferably 5 to 35,000, most preferred 5 to 25,000 (ASTM D-1824-66; determined on a Brookfield viscosimeter). For example, the degraded low viscosity polyethylenes can be prepared by thermally degrading conventional high molecular weight high, medium and low density polyethylene polymers prepared by conventional polymerization processes. These high molecular weight polyethylene polymers can have a density of from about 0.92 to about 1.00 and an inherent viscosity of from 0.1 to 2.0 in Tetralin at 145° C. The thermal degradation of the conventional high molecular weight polyethylene polymers can be accomplished by heating at elevated temperatures causing the polymer chain to rupture apparently at the points of chain branching of the polymeric material. The degree of degradation is controlled by reaction time and temperature to give a thermally degraded low molecular weight polyethylene wax polymeric material. By carefully controlling the time, temperature and agitation, a thermally degraded polyethylene of relatively narrower molecular weight range than the starting high molecular weight polymer is obtained. The degradation is carried out at a temperature from 290° C. to about 425° C. Degraded waxes generally are unsaturated and if the percentage of unsaturation is greater than 0.1 percent, the wax is hydrogenated to reduce the unsaturation to less than 0.1 percent, preferably less than 0.05 percent.

The low viscosity polyethylene waxes are reacted with unsaturated polycarboxylic component such as an unsaturated polycarboxylic acid, anhydride or ester thereof at temperatures from about 180° C. to 250° C., preferably from about 210°–220° C., and in the presence about 1 to 10 percent of free radical source, based on the weight of the unmodified wax, and at least one viscosity stabilizer, thereby increasing the saponification number of the low viscosity wax. An amount of free radical source less than 1 percent generally causes the reaction to be too slow and an amount greater than 10 percent decomposes and causes a loss of peroxide without promoting any additional reaction.

Suitable free radical sources are, for example, peroxides having decomposition rates such that the half life of the catalyst is equal to or greater than 0.1 second at the reaction temperature. Such preferred peroxides are ditertiary butyl peroxide and 2,5-dimethyl-2,5-di(tertbutyl peroxy)hexane. However, peroxides such as tertiary butyl hydroperoxide and cumene hydroperoxide, can be used. The reaction may be carried out either in a batchwise or in a continuous manner with contact times in the order of about 10 minutes to about 2 hours depending on the saponification of the product desired number.

Suitable unsaturated polycarboxylic acids and anhydrides are, for example, maleic acid, maleic anhydride, fumaric acid, citraconic anhydride, aconitic anhydride and itaconic anhydride. Suitable esters are, for example, half or full esters such as methyl hydrogen maleate, dimethyl maleate, dimethyl fumarate, methyl ethyl maleate, dibutyl maleate, dipropyl maleate, and the like, or those compounds which form these compounds at elevated reaction temperatures such as citric acid, for example. Preferably, about 0.5 to 25% unsaturated polycarboxylic acid, anhydride or esters thereof, based on the weight of the low viscosity polyolefin, can be used in the invention. The most preferred emulsifiable modified low molecular weight polyethylene waxes have a melt viscosity of 5 to 20,000 centipoise at 150° C., preferably 5 to 10,000, most preferably 5 to 6,000, and a saponification number of about 60 to about 250, most preferably about 100 to 140, and a Gardner color of 7 or less. The most preferred nonemulsifiable modified low molecular weight polyethylene or ethylene/alpha-olefin waxes suitable as components of hot-melt adhesives and similar uses and applications have a melt viscosity of 500–40,000 cp. at 150° C., preferably 1,500 to 35,000, most preferred 15,000 to 25,000, and a saponification number of about 4 to about 60, most preferably about 10 to about 40 and a Gardner color of 7 or less. The saponification number is modified by the amount of unsaturated polycarboxylic component, the reaction temperature and time.

The use of viscosity stabilizers in the grafting reactions allows the grafting reactions to be conducted at considerably lower temperatures even when very large quantities of unsaturated compounds are grafted onto the wax. Moreover, although good laboratory practice dictates that oxygen should be excluded, it has been found that extreme measures to eliminate all traces of oxygen are unnecessary, when the viscosity stabilizers are employed. The compounds which function to stabilize the viscosity increase upon grafting include, but are not limited to, straight and branched alkyl thiols, aralkyl thiols, straight and branched alkyl halides, aralkyl halides, and compounds containing allylic or benzylic hydrogen atoms. A list of some of the more effective viscosity stabilizers are listed as chain-transfer agents in "Polymer Handbook," J. Brandrup and E. H. Immergut, ed., Interscience Publishers, New York, copyrighted 1966, II 77–II133. Particularly preferred compounds include straight and branched alkyl thiols having 1 to 20 carbon atoms such as methanethiol, ethanethiol, propanethiol, butanethiol, hexanethiol, heptanethiol, octanethiol, nonanethiol, diethioglycol, tertiary dodecyl mercaptan, 1-dodecanethiol; aromatic thiols such as benzenethiol, naphthenethiol and the like; straight and branched alkyl halides such as methyl chloride, ethyl chloride, propyl chloride and the like; aralkyl halides such as benzyl chloride, benzyl bromide and the like; compounds having benzylic hydrogen atoms such as toluene, tetralin, xylene, fluorene and the like; and compounds having allylic hydrogen atoms such as 1,4-pentadiene and the like. The amount of viscosity stabilizer is about 0.5 to 10 percent, by weight, preferably 2 to 7, most preferred 4 to 6, based on the weight of the low viscosity wax to be reacted. Moreover, a single viscosity stabilizer can be used or a combination of such viscosity stabilizers can be used. Especially useful compounds in the current invention are tertiary dodecyl mercaptan and 1-dodecanethiol.

One method for the determination of saponification number of maleated polyethylene is as follows: Weigh approximately 1 g. of the sample into a 500 ml. alkali-resistant Erlenmeyer flask and add 100 ml. distilled xylene and 50 ml of n-butanol. Heat under a reflux condenser for 1 hour. Cool the solution to 75° C. or less, and add from a buret 10 ml. standardized 0.50 N KOH in ethyl alcohol. Heat under reflux for 45 min. Cool, and add from a buret standardized 0.10 N $CH_3COOH$ in xylene until the mixture is acid to phenolphthalein. Add at least 1 ml. excess $CH_3COOH$. Reheat the solution under reflux for 15 min. Remove from heat, add 5 ml. water, and titrate to a faint pink end point with 0.10 N KOH in ethyl alcohol. Run a blank in this manner using the same amounts of reagents and the same heating times.

Calculation:

$$\frac{[(ml. \text{ KOH} \times N) - (ml. \text{ CH}_3\text{COOH} \times N)] \text{ (for sample)} - [(ml. \text{ KOH} \times N) - (ml. \text{ CH}_3\text{COOH} \times N)] \text{ (for blank)} \times 56.1}{g. \text{ Sample}} = \text{Sap. No.}$$

The unreacted, unsaturated polycarboxylic acid can be separated from the reaction mixture by purging the reaction mixture with an inert gas while the melt temperature is between 200° and 300° C. After the unreacted unsaturated polycarboxylic acid has been removed, the modified poly-α-olefin can be further purified by vacuum stripping, solvent extraction, or dissolving in a suitable solvent and isolated by removing the solvent.

This invention can be further illustrated by the following examples of preferred embodiments thereof, although it will be understood that these examples are included merely for purposes of illustration and are not intended to limit the scope of the invention unless otherwise specifically indicated.

EXAMPLES 1-4

These examples were conducted in the same manner. They differ only in the amount of tertiary dodecyl mercaptan used.

A 500-ml., four-necked flask is fitted with a stirrer, a condenser with a trap, a thermowell and a pressure equalizing dropping funnel, and a nitrogen gas inlet or bubbler. The flask is charged with 150 g. of low viscosity polyethylene wax (density of 0.96 and a melt viscosity of 50 cp. at 150° C., an unsaturation of less than 0.1 percent and a saponification number of 0). The reaction flask was purged with $N_2$ to remove air while the wax melted. After the wax became molten, the $N_2$ bubbler was arranged so an inert atmosphere would be maintained above the wax. The temperature of the molten wax was 190° C.

An acetone solution containing 30 grams of maleic anhydride, 7.5 grams of di-tertiary-butyl peroxide, and the desired amount of tertiary dodecyl mercaptan was prepared. The minimum amounts of acetone required to completely dissolve the maleic anhydride were used. In each experiment the total volume of acetone, dissolved maleic anhydride, peroxide, and mercaptan was approximately 80 ml. The solution was placed in the dropping funnel and added dropwise over approximately 1 hour to the stirred, molten wax. Approximately 20 minutes after the final addition of reactants to the flask was made, the flask was purged with $N_2$ for at least 1 hour to remove unreacted maleic anhydride and mercaptan. The grafted wax was poured into a silicon-lined container and allowed to cool. Properties of the waxes after grafting are shown in the following table.

| Examples | 1 | 2 | 3 | 4 |
|---|---|---|---|---|
| Reagents Charged: | | | | |
| Polyethylene Wax, g | 150 | 150 | 150 | 150 |
| Maleic Anhydride, g | 30 | 30 | 30 | 30 |
| Di-tertiary-butyl Peroxide, g | 7.5 | 7.5 | 7.5 | 7.5 |
| Tertiary Dodecyl Mercaptan, g | 0 | 0.84 | 1.68 | 3.36 |
| Properties | | | | |
| Sap Number | 167 | 156.2 | 165.4 | 165.6 |
| Viscosity at 150° C., cp | 7,000 | 2,500 | 1,025 | 700 |
| RBSP, °C. | 126 | 120 | 122 | 122 |
| Penetration Hardness, 0.1 mm | 0.1 | 0.1 | 0.1 | 0.1 |
| Specific Gravity | 1.013 | 1.018 | 1.027 | 0.998 |

These examples show that as the amount of viscosity stabilizer, tertiary dodecyl mercaptan, is increased the viscosity of the grafted product is decreased.

EXAMPLES 5-8

This example illustrates the manner in which emulsions of the waxes in Examples 1-4 were prepared.

To a 300-ml autoclave 30 grams of grafted wax, 7 grams of 2-amino-2-methylpropanol, 8 grams of oleic acid, 5.46 grams of KOH, and 150 ml of distilled water were charged. The contents of the autoclave were heated to 150° C. and held at this temperature for 30 minutes with stirring. Stirring was continued while the emulsion was cooled to 50° C. by passing cold water through the cooling coils.

The wax from Example 1 was essentially unemulsifiable. A large quantity of the wax was coated on the sides and bottom of the autoclave.

The wax from Example 2 contained a large amount of swollen gel-like material which did not emulsify. The quality of the emulsion was poor.

The wax from Example 3 contained less than 1 gram of unemulsified gel. The emulsion was filtered through cheesecloth. It was fluid and slightly more viscous than water. A protion of the emulsion diluted to 1 percent solids had a transmittance of 62 percent relative to water measured at 525 m$\mu$ wavelength.

The wax from Example 4 contained no coagulum. It had a transmittance value of 65 percent relative to water at 525 m$\mu$.

Thus, the waxes of Examples 3 and 4 can be used in emulsion form. Even though the wax of Example 1 has approximately the same saponification number, it cannot be used in emulsion form using this recipe to make the emulsion. The wax of Example 2 likewise has approximately the same saponification number and the emulsion prepared from this wax was poor.

EXAMPLE 9

About 145.6 grams of a hydrogenated degraded low molecular weight low density polyethylene having a Ring and Ball softening point of 106° C., a density of 0.920 g/cc at 25° C., a melt viscosity of 144 cp at 150° C., a molecular weight of about 1,800, an unsaturation of less than 0.01 percent and a saponification number of 0 is placed in a 500 ml., four-necked flask fitted with a stirrer, a condenser with a trap, a thermowell and a pressure equalizing dropping funnel, and a nitrogen gas inlet or bubbler. The reaction flask was purged with $N_2$ to remove air while the wax melted. After the wax became molten, the $N_2$ bubbler was arranged so an inert atmosphere would be maintained above the wax. The temperature of the molten wax was 190° C.

An acetone solution containing 38.8 grams of maleic anhydride, 9.8 grams of di-tertiary butyl peroxide, and 5.8 grams of tertiary dodecyl mercaptan was prepared. The minimum amounts of acetone required to completely dissolve the maleic anhydride were used. The total volume of acetone, dissolved maleic anhydride, peroxide, and mercaptan was approximately 80 ml. The solution was placed in the dropping funnel and added dropwise over approximately 1 hour to the stirred molten wax. Approximately 30 minutes after the final addition of reactants to the flask was made, the flask was purged with $N_2$ for 1.5 hours to remove unreacted maleic anhydride and mercaptan. The grafted wax was poured into a silicon-lined container and allowed to cool. The modified low density polyethylene wax had a saponification number of 220, a melt viscosity of 1,312 cp. at 150° C., Ring and Ball Softening Point of 93° C., a penetration hardness of 4.8 and a specific gravity of 0.977.

To a 300-ml autoclave 30 grams of grafted wax, 7 grams of 2-amino-2-methylpropanol, 8 grams of oleic acid, 3.3 grams of KOH, and 150 ml of distilled water were charged. The contents of the autoclave were heated to 150° C. and held at this temperature for 30 minutes with stirring. Stirring was continued while the emulsion was cooled to 50° C. by passing cold water through the cooling coils.

The transmittance of a 1 percent solids solution of the emulsion was 92 percent. The compatability of the modified polyethylene was determined by adding 1 part of a 24 percent solids emulsion to 9 parts of a commercial water clear floor polish. The mixture was placed in a 60° C. oven for 30 days. At the end of this period the mixture was still transparent.

EXAMPLE 10

About 157.2 grams of a hydrogenated degraded low molecular weight low density polyethylene having a Ring and Ball softening point of 106° C., a density of 0.920 g/cc at 25° C., a melt viscosity of 144 cp at 150° C., a molecular weight of about 1,800, an unsaturation of less than 0.01 percent and a saponification number of 0 is placed in a 500 ml., four-necked flask fitted with a stirrer, a condenser with a trap, a thermowell and a pressure equalizing dropping funnel, and a nitrogen gas inlet or bubbler. The reaction flask was purged with $N_2$ to remove air while the wax melted. After the wax because molten, the $N_2$ bubbler was arranged so an inert atmosphere would be maintained above the wax. The temperature of the molten wax was 190° C.

An acetone solution containing 31.4 grams of maleic anhydride, 7.8 grams of di-tertiary butyl peroxide, and 3.6 grams of tertiary dodecyl mercaptan was prepared. The minimum amounts of acetone required to completely dissolve the maleic anhydride were used. The total volume of acetone, dissolved maleic anhydride, peroxide, and mercaptan was approximately 80 ml. The solution was placed in the dropping funnel and added dropwise over approximately 1 hour to the stirred molten wax. Approximately 30 minutes after the final addition of reactants to the flask was made, the flask was purged with $N_2$ for 1.5 hours to remove unreacted maleic anhydride and mercaptan. The grafted wax was poured into a silicon-lined container and allowed to cool. The modified low density polyethylene wax had a saponification number of 176.2, a melt viscosity of 975 cp. at 150° C., Ring and Ball Softening Point of 93° C., a penetration hardness of 4.2 and a specific gravity of 0.967.

EXAMPLE 11

About 157.2 grams of a degraded low molecular weight low density polyethylene having a Ring and Ball softening point of 106° C., a density of 0.920 g/cc at 25° C., a melt viscosity of 144 cp at 150° C., a molecular weight of about 1,800, an unsaturation of 0.29 percent and a saponification number of 0 is placed in a 500 ml., four-necked flask fitted with a stirrer, a condenser with a trap, a thermowell and a pressure equalizing dropping funnel, and a nitrogen gas inlet or bubbler. The reaction flask was purged with $N_2$ to remove air while the wax melted. After the wax because molten, the $N_2$ bubbler was arranged so an inert atmosphere would be maintained above the wax. The temperature of the molten wax was 190° C.

An acetone solution containing 31.4 grams of maleic anhydride, 7.8 grams of di-tertiary butyl peroxide, and 3.6 grams of tertiary dodecyl mercaptan was prepared. The minimum amounts of acetone required to completely dissolve the maleic anhydride were used. The total volume of acetone, dissolved maleic anhydride, peroxide, and mercaptan was approximately 80 ml. The solution was placed in the dropping funnel and added dropwise to the stirred molten wax. The molten wax began to crosslink and become more viscous and after ten minutes was too viscous to stir. This example shows that the presence of a viscosity stabilizer does not prevent crosslinking when a wax has unsaturation greater than 0.1 percent

EXAMPLE 12

About 160 grams of a hydrogenated degraded low molecular weight low density polyethylene having a Ring and Ball softening point of 106° C., a density of 0.920 g/cc at 25° C., a melt viscosity of 144 cp at 150° C., a molecular weight of about 1,800, an unsaturation of less than 0.01 percent and a saponification number of 0 is placed in a 500 ml., four-necked flask fitted with a stirrer, a condenser with a trap, a thermowell and a pressure equalizing dropping funnel, and a nitrogen gas inlet or bubbler. The reaction flask was purged with $N_2$ to remove air while the wax melted. After the wax because molten, the $N_2$ bubbler was arranged so an inert atmosphere would be maintained above the wax. The temperature of the molten wax was 190° C.

An acetone solution containing 32 grams of maleic anhydride and 8 grams of di-tertiary butyl peroxide was prepared. The minimum amounts of acetone required to completely dissolve the maleic anhydride were used. The total volume of acetone, dissolved maleic anhydride, and peroxide was approximately 80 ml. The solution was placed in the dropping funnel and added dropwise over approximately 1 hour to the stirred molten wax. Approximately 30 minutes after the final addition of reactants to the flask was made, the flask was purged with $N_2$ for 1.5 hours to remove unreacted maleic anhydride. The grafted wax was poured into a silicon-lined container and allowed to cool. The modified low density polyethylene wax had a saponification number of 167.8, a melt viscosity of 56,000 cp. at 150° C., Ring and Ball Softening Point of 110° C., a penetration hardness of 4.5 and a specific gravity of 0.967. This example shows the increase in viscosity when a wax having less than 0.1 percent unsaturation is reacted without the viscosity stabilizer as shown by comparing the results of this example with the results of Example 10.

EXAMPLE 13

About 96.5 grams of a low molecular weight low density polyethylene wax having a Ring and Ball softening point of 102° C., a density of 0.906 g/cc at 250° C., a melt viscosity of 4,300 cp. at 150° C., a melt index of 4,200 at 190° C., and a molecular weight of about 4,000 and an unsaturation of less than 0.01 percent is placed in a 500 ml., four-necked flask fitted with a stirrer, a condenser with a trap, a thermowell and a pressure equalizing dropping funnel, and a nitrogen gas inlet or bubbler. The reaction flask was purged with $N_2$ to remove air while the wax melted. After the wax became molten, the $N_2$ bubbler was arranged so an inert atmosphere would be maintained above the wax. The temperature of the molten wax was 190° C.

An acetone solution containing 2.5 grams of maleic anhydride, 0.5 grams of di-tertiary-butyl peroxide, and 0.5 gram of tertiary dodecyl mercaptan was prepared. The minimum amounts of acetone required to completely dissolve the maleic anhydride were used. The total volume of acetone, dissolved maleic anhydride, peroxide, and mercaptan was approximately 20 ml. The solution was placed in the dropping funnel and added dropwise over approximately 1 hour to the stirred, molten wax. Approximately 20 minutes after the final addition of reactants to the flask was made, the flask was purged with $N_2$ for at least 1 hour to remove unreacted maleic anhydride and mercaptan. The grafted was was poured into a silicon-lined container and allowed to cool. The modified low density wax had a saponification number of 22.2, a softening point of 103° C., and a melt viscosity of 12,300 cp. at 150° C.

EXAMPLE 14

About 93.2 grams of a low molecular weight low density polyethylene wax having a Ring and Ball softening point of 102° C., a density of 0.906 g/cc at 250° C., a melt viscosity of 4,300 cp. at 150° C., a melt index of 4,200 at 190° C., and a molecular weight of about 4,000 and an unsaturation of less than 0.01 percent is placed in a 500 ml., four-necked flask fitted with a stirrer, a condenser with a trap, a thermowell and a pressure equalizing dropping funnel, and a nitrogen gas inlet or bubbler. The reaction flask was purged with $N_2$ to remove air while the wax melted. After the wax became molten, the $N_2$ bubbler was arranged so an inert atmosphere would be maintained above the wax. The temperature of the molten wax was 190° C.

An acetone solution containing 4.7 grams of maleic anhydride, 1.05 grams of ditertiarybutyl peroxide, and 1.05 grams of tertiary dodecyl mercaptan was prepared. The minimum amounts of acetone required to completely dissolve the maleic anhydride were used. The total volume of acetone, dissolved maleic anhydride, peroxide, and mercaptan was approximately 30 ml. The solution was placed in the dropping funnel and added dropwise over approximately 1 hour to the stirred, molten wax. Approximately 20 minutes after the final addition of reactants to the flask was made, the flask was purged with $N_2$ for at least 1 hour to remove unreacted maleic anhydride and mercaptan. The grafted wax was poured into a silicon lined container and allowed to cool. The modified low density wax had a saponification number of 40.92, a softening point of 101° C., and a melt viscosity of 19,300 cp. at 150° C.

EXAMPLE 15

About 87.3 grams of a low molecular weight low density polyethylene wax having a Ring and Ball softening point of 102° C., a density of 0.906 g/cc at 250° C., a melt viscosity of 4,300 cp. at 150° C., a melt index of 4,200 at 190° C., and a molecular weight of about 4,000 and an unsaturation of less than 0.01 percent is placed in a 500 ml., four-necked flask fitted with a stirrer, a condenser with a trap, a thermowell and a pressure equalizing dropping funnel, and a nitrogen gas inlet or bubbler. The reaction flask was purged with $N_2$ to remove air while the wax melted. After the wax became molten, the $N_2$ bubbler was arranged so an inert atmosphere would be maintained above the wax. The temperature of the molten wax was 190° C.

An acetone solution containing 8.7 grams of maleic anhydride, 2.0 grams of ditertiarybutyl peroxide, and 2.0 grams of tertiary dodecyl mercaptan was prepared. The minimum amounts of acetone required to completely dissolve the maleic anhydride were used. The total volume of acetone, dissolved maleic anhydride, peroxide, and mercaptan was approximately 30 ml. The solution was placed in the dropping funnel and added dropwise over approximately 1 hour to the stirred, molten wax. Approximately 20 minutes after the final addition of reactants to the flask was made, the flask was purged with $N_2$ for at least 1 hour to remove unreacted maleic anhydride and mercaptan. The grafted wax was poured into a silicon-lined container and allowed to cool. The modified low density wax had a saponification number of 80.1, a softening point of 101° C., and a melt viscosity of 39,000 cp. at 150° C. and provided emulsions having an emulsion transmittance greater than 85%.

EXAMPLE 16

Hot-melt adhesives 1 to 3 were prepared using 70 grams of the modified low density waxes prepared in Examples 13 to 15, respectively, combined with 29.55 grams of a hydrocarbon tackifier resin having a Ring and Ball softening point of 130° C., 0.1 grams tetrakis[methylene(3,5-di-tert-butyl-s 4-hydroxyhydrocinnamate)methane] (Irganox 1010) and 0.35 grams lauryl stearyl thiodipropionate (Cyanox 1212). These adhesives had the following properties:

| Properties | Adhesives | | |
| --- | --- | --- | --- |
| | 1 | 2 | 3 |
| Viscosity at 350° F., cp. | 2600 | 3300 | 6130 |
| Softening Point, °C. | 97 | 96 | 96 |
| Elevated Temperature Peel, °F. | 132 | 150 | 165 |
| Elevated Temperature Shear, °F. | 188 | 188 | 182 |
| Room Temperature Peel, g. Adhesion, Lb. | 780 | 1030 | 940 |
| Foil-To-Foil | 3.2 | 3.4 | 3.9 |
| Corrugated Board at −20° F. | FT | FT | FT |

FT = Fiber Tear

It was completely unexpected that a process as disclosed in the present application would be operable to provide emulsifiable low molecular weight materials since prior art teaches that such products can be prepared only in the absence of peroxide or in the presence of peroxide only when oxygen is rigorously excluded. Example 7 of U.S. Pat. No. 4,028,436 shows that modification of a 500 cp degraded polyethylene with maleic anhydride in the presence of peroxide yields a gel-containing or lightly crosslinked product having a viscosity of 33,750 cp at 125° C. and a saponification number of 46 when air is not rigorously excluded from the reaction mixture. Polymer gel formation prevents the product from being emulsifiable. However, Example 15 of the present application shows a polyethylene wax having a melt viscosity of 4000 cp at 150° C. can be modified with maleic anhydride using a peroxide initiator under conditions where oxygen is not rigorously excluded to yield an emulsifiable product having a saponification number of 80.1 and a melt viscosity at 150° C. of 39,000.

The modified low molecular weight poly-α-olefin compositions of this invention are useful for many purposes. The emulsifiable waxes are useful in preparing nonionic and anionic emulsions which are excellent textile-treating agents which improve the scuff resistance of fabrics such as permanently creased cotton fabrics. The emulsions are also useful in floor polish compositions providing scuff resistant, hard, glossy finishes. The nonemulsifiable waxes are useful in preparing hot-melt adhesives.

The invention has been described in considerable detail with particular reference to preferred embodiments thereof, but it will be understood that variations and modifications can be effected within the spirit and scope of the invention.

I claim:

1. A process for the preparation of modified low viscosity polyethylene and ethylene/alpha-olefin copolymer waxes which comprises reacting an unmodified polyethylene wax or an ethylene/alpha-olefin wax containing 99 to 50 percent ethylene, said wax having a melt viscosity of 5 to 40,000 cp. at 150° C., an unsaturation of less than 0.1 percent, with about 0.5 to 25 weight percent of an unsaturated polycarboxylic component in the presence of a free radical source and in the presence of at least one viscosity stabilizer at a temperature of from 180° C. to 250° C, to prepare a modified wax having a saponification number of from about 4 to 250.

2. A process according to claim 1 wherein said unsaturated polycarboxylic component is maleic anhydride.

3. A process according to claim 2 wherein said free radical source is ditertiary butyl peroxide.

4. A process according to claim 3 wherein said viscosity stabilizer is tertiary dodecyl mercaptan.

5. A process according to claim 3 wherein said viscosity stabilizer is 1-dodecanethiol.

6. A process for the preparation of modified low viscosity polyethylene which comprises reacting an unmodified polyethylene wax having a melt viscosity of 5 to 35,000 cp. at 150° C., an unsaturation of less than 0.1 percent with about 0.5 to 25 weight percent of an unsaturated polycarboxylic component in the presence of a free radical source and in the presence of at least one viscosity stabilizer at a temperature of from 180° C. to 250° C. to prepare a modified wax having a saponification number of from about 4 to 250.

7. A process according to claim 6 wherein said unsaturated polycarboxylic component is maleic anhydride.

8. A process according to claim 7 wherein said free radical source is ditertiary butyl peroxide.

9. A process according to claim 7 wherein said viscosity stabilizer is tertiary dodecyl mercaptan.

10. A process according to claim 8 wherein said viscosity stabilizer is 1-dodecanethiol.

11. A process for the preparation of modified low viscosity ethylene/alpha-olefin copolymer waxes which comprises reacting an unmodified ethylene/alpha-olefin wax containing 99 to 50 percent ethylene having a melt viscosity of 5 to 35,000 cp. at 150° C., an unsaturation of less than 0.1 percent with about 0.5 to 25 weight percent of an unsaturated polycarboxylic component in the presence of a free radical source and in the presence of at least one viscosity stabilizer at a temperature of from 180° C. to 250° C. to prepare a modified wax having a saponification number of from about 4 to 250.

12. A process according to claim 11 wherein said unsaturated polycarboxylic component is maleic anhydride.

13. A process according to claim 12 wherein said free radical source is ditertiary butyl peroxide.

14. A process according to claim 13 wherein said viscosity stabilizer is tertiary dodecyl mercaptan.

15. A process according to claim 13 wherein said viscosity stabilizer is 1-dodecanethiol.

16. A process for the preparation of modified emulsifiable low viscosity polyethylene wax which comprises reacting an unmodified polyethylene wax having a melt viscosity of 5 to 25,000 cp. at 150° C., an unsaturation of less than 0.1 percent with about 0.5 to 25 weight percent of an unsaturated polycarboxylic component in the presence of a free radical source and in the presence of at least one viscosity stabilizer at a temperature of from 180° C. to 250° C. to prepare a modified wax having a saponification number of from about 60 to 250.

17. A process according to claim 16 wherein said unsaturated polycarboxylic component is maleic anhydride.

18. A process according to claim 17 wherein said free radical source is ditertiary butyl peroxide.

19. A process according to claim 18 wherein said viscosity stabilizer is tertiary dodecyl mercaptan.

20. A process according to claim 18 wherein said viscosity stabilizer is 1-dodecanethiol.

21. A process for the preparation of modified emulsifiable low viscosity ethylene/alpha-olefin copolymer wax which comprises reacting an unmodified ethylene/alpha-olefin wax containing 99 to 50 percent ethylene having a melt viscosity of 5 to 25,000 cp. at 150° C., an unsaturation of less than 0.1 percent, with about 0.5 to 25 weight percent of an unsaturated polycarboxylic component in the presence of a free radical source and in the presence of at least one viscosity stabilizer at a temperature of from 180° C. to 250° C. to prepare a modified wax having a saponification number of from about 60 to 250.

22. A process according to claim 21 wherein said unsaturated polycarboxylic component is maleic anhydride.

23. A process according to claim 22 wherein said free radical source is ditertiary butyl peroxide.

24. A process according to claim 23 wherein said viscosity stabilizer is tertiary dodecyl mercaptan.

25. A process according to claim 23 wherein said viscosity stabilizer is 1-dodecanethiol.

26. A process for the preparation of modified low viscosity polyethylene wax which comprises reacting an unmodified polyethylene wax having a melt viscosity of 5 to 40,000 cp. at 150° C., an unsaturation of less than 0.1 percent with about 0.5 to 25 weight percent of an unsaturated polycarboxylic component in the presence of a free radical source and in the presence of at least one viscosity stabilizer at a temperature of from 180° C. to 250° C. to prepare a modified wax having a saponification number of from about 100 to 140.

27. A process according to claim 26 wherein said unsaturated polycarboxylic component is maleic anhydride.

28. A process according to claim 27 wherein said free radical source is ditertiary butyl peroxide.

29. A process according to claim 28 wherein said viscosity stabilizer is tertiary dodecyl mercaptan.

30. A process according to claim 29 wherein said viscosity stabilizer is 1-dodecanethiol.

31. A process for the preparation of modified low viscosity ethylene/alpha-olefin copolymer wax which comprises reacting an unmodified ethylene/alpha-olefin wax containing 99 to 50 percent ethylene having a melt viscosity of 5 to 25,000 cp. at 150° C., an unsaturation of less than 0.1 percent, with about 0.5 to 25 weight percent of an unsaturated polycarboxylic component in the presence of a free radical source and in the presence of at least one viscosity stabilizer at a temperature of from 180° C. to 250° C. to prepare a modified wax having a saponification number of from about 100 to 140.

32. A process according to claim 31 wherein said unsaturated polycarboxylic component is maleic anhydride.

33. A process according to claim 32 wherein said free radical source is ditertiary butyl peroxide.

34. A process according to claim 33 wherein said viscosity stabilizer is tertiary dodecyl mercaptan.

35. A process according to claim 33 wherein said viscosity stabilizer is 1-dodecanethiol.

36. A process for the preparation of modified unemulsifiable low viscosity polyethylene wax which comprises reacting an unmodified polyethylene wax having a melt viscosity of 500 to 40,000 cp. at 150° C., an unsaturation of less than 0.1 percent with about 0.5 to 25 weight percent of an unsaturated polycarboxylic component in the presence of a free radical source and in the presence of at least one viscosity stabilizer at a temperature of from 180° C. to 250° C. to prepare a modified wax having a saponification number of from about 4 to 60.

37. A process according to claim 36 wherein said unsaturated polycarboxylic component is maleic anhydride.

38. A process according to claim 37 wherein said free radical source is ditertiary butyl peroxide.

39. A process according to claim 38 wherein said viscosity stabilizer is tertiary dodecyl mercaptan.

40. A process according to claim 37 wherein said viscosity stabilizer is 1-dodecanethiol.

* * * * *